United States Patent [19]

Feuz et al.

[11] Patent Number: 5,016,539
[45] Date of Patent: May 21, 1991

[54] TRACK INSTALLATION FOR THE VEHICLES OF A TRANSPORT INSTALLATION, ESPECIALLY A REVOLVING AERIAL CABLE TRANSPORT INSTALLATION

[75] Inventors: Fritz Feuz, Thun; Ferdinand Hora, Burgdorf; Fritz Linder, Heimberg, all of Switzerland

[73] Assignee: Von Roll Transportsysteme AG, Thun, Switzerland

[21] Appl. No.: 240,969

[22] Filed: Sep. 6, 1988

[30] Foreign Application Priority Data

Sep. 9, 1987 [CH] Switzerland .................... 3488/87

[51] Int. Cl.$^5$ ............................ B61B 3/00; B61K 7/16
[52] U.S. Cl. ..................................... 104/28; 104/249; 104/253
[58] Field of Search ...................... 104/27, 28, 29, 180, 104/172.3, 172.4, 173.1, 249–253, 257

[56] References Cited

U.S. PATENT DOCUMENTS

| 1,682,718 | 8/1928 | Merritt | 104/252 X |
|---|---|---|---|
| 3,072,073 | 1/1963 | Peterson et al. | 104/250 |
| 3,418,946 | 12/1968 | Yokoi et al. | 104/253 |
| 3,690,269 | 9/1972 | Hempstead | 104/172.4 |
| 3,800,710 | 4/1974 | Raoulx | 104/251 |
| 3,954,065 | 5/1976 | te Velde et al. | 104/252 X |
| 3,995,561 | 12/1976 | Allor, Jr. | 104/252 X |
| 4,644,869 | 2/1987 | Rhodes | 104/252 X |

FOREIGN PATENT DOCUMENTS

| 0018932 | 11/1980 | European Pat. Off. |
|---|---|---|
| 0245163 | 11/1987 | European Pat. Off. |
| 366328 | 8/1981 | Fed. Rep. of Germany |
| 2327899 | 5/1977 | France |
| 2593795 | 7/1987 | France |

Primary Examiner—Johnny D. Cherry
Assistant Examiner—Dean J. Kramer
Attorney, Agent, or Firm—Cushman, Darby & Cushman

[57] ABSTRACT

A track installation for vehicles of a transport installation comprises a track supporting the vehicles at their vehicle carriages and possessing an inbound side and an outbound side for the vehicles. A conveyor is operatively associated with the track and contains entrainment members for entraining coaction with the vehicles. The track constitutes a generally or essentially horizontal track structure and extends along the complete length of the conveyor. Vehicle stops defining stop or parking positions for the vehicles are distributively arranged along the track. Each stop is provided with an actuation element and each stop or parking position has a vehicle sensor as well as an interrupter for disabling the entrainment of the there parked vehicle by the conveyor. The vehicle sensor of each stop or parking position is connected with the actuation element of the stop and also with the interrupter of the preceding or upstream located stop or parking position viewed in the vehicle conveying direction. Each interrupter is structured to act upon an entrainment connection between an entrainment member of the conveyor and a vehicle to disable vehicle conveyance.

11 Claims, 4 Drawing Sheets

TRACK INSTALLATION FOR THE VEHICLES OF A TRANSPORT INSTALLATION, ESPECIALLY A REVOLVING AERIAL CABLE TRANSPORT INSTALLATION

BACKGROUND OF THE INVENTION

The present invention broadly relates to transport installations or arrangements, and, more particularly, to a new and improved construction of a track installation or arrangement for the vehicles of a cable transport installation, especially a revolving aerial cable or cableway transport installation, sometimes also referred to in the art as an aerial ropeway transport installation.

Generally speaking, the track installation or arrangement for the vehicles of a transport installation, especially a revolving aerial cable or cableway transport installation as contemplated by the present development is of the type comprising a track or track line system, sometimes briefly simply referred to herein as a track, upon which there are supported the carriages of the travelling or mobile vehicles. Such track comprises an inbound side and an outbound side for the vehicles as well as a conveyor or conveyor device operatively associated with the track. The conveyor is provided with entrainment members for coaction with the vehicles for travelling or mobile entrainment thereof.

In the case of aerial cable or cableway transport installations designed as revolving or endless gondola cable transport installations, it is known in this technology to accommodate or correlate the plurality of vehicles which are in circulation or in their revolving transport mode to the momentary transport capacity requirements. This is accomplished for the purpose of saving drive energy and to reduce the wear of the aerial cable transport installation. To that end, those vehicles which are momentarily not required to be placed in use are parked or stationed at side tracks or parking tracks which are operatively associated with at least one of the stations of the aerial cable transport installation. These sidetracks or parking tracks are connected by switches with the station main track of the aerial cable transport installation. The parking tracks are generally deployed within the building structure of the station or at a parking area thereof in order to protect the vehicles against effects of the climate or environment. As concerns the course or layout of the track structure or line there are known to the art installations in which one end of the parking track which forms a number of interconnected loops is associated or connected with the disembarking side of the station main track and the other end with the embarking side of the station main track. The vehicles are manually pushed or displaced onto the parking track.

A track installation of the type generally described above at the outset of this disclosure has become known in this art. Viewed in the lengthwise profile or section of such track installation the parking track comprises a plurality of successive ascending and descending track sections or portions. A chain conveyor is operatively associated with each of the ascending track sections or portions. Each such chain conveyor takes over the vehicles at the end of a descending section and transports such vehicles to the starting region of the next following ascending track section or portion. The inclination of the descending track section is selected such that the vehicles negotiate the same by virtue of their inherent weight.

However, practical experience has shown that in such prior art system the unavoidable differences in the rolling friction of the individual vehicle carriages, something also attributable to the encountered weather or climatic conditions, leads to different rolling behavior of the vehicle carriages. This in turn, results in disturbances in the operation of the aerial cable transport installation which then must be eliminated by the operating personnel. There also result, under circumstances, even damage to successive vehicles, in this case the gondolas, which run into one another or become jammed in one another.

Additionally, a fundamental drawback of such prior art track installation resides in the fact that the structural or erection costs of the track installation are appreciably increased. During the computation of the internal height of the building or building structure which houses the track installation there must be added to the vehicle height the excess height of the parking track between the lowest point and the highest point of the lengthwise section of the parking track. This increase in height also has a pronounced effect upon the volume of the building, particularly when it is appreciated that such track installation, even if optimumly designed, occupies an appreciable surface area.

SUMMARY OF THE INVENTION

Therefore with the foregoing in mind it is a primary object of the present invention to provide a new and improved construction of a track installation for vehicles of a transport installation, especially a revolving aerial cable or cableway transport installation, which does not suffer from the aforementioned drawbacks and shortcomings of the prior art.

Another and more specific object of the present invention, aims at the provision of a new and improved construction of a track installation for vehicles of a cable transport installation, especially an aerial cable or cableway transport installation, wherein the track installation is designed such that it can be erected in a building in an exceedingly space saving and economical fashion with reduced structural height of the building.

Yet a further significant object of the present invention, aims at the provision of a new and improved construction of a track installation or arrangement for a cable transport installation, which allows for efficient, reliable and safe parking of vehicles of the cable transport installation in an optimumly utilized region or area of the building or the like while also ensuring for protective forward shifting or advance of the vehicles between successive stop or parking positions of the track installation or arrangement.

A still further important object of the present invention, is concerned with providing an improved track installation or arrangement for a cable transport installation wherein the vehicles, such as by way of example and not limitation, gondolas, can be reliably and efficiently parked at the track installation or arrangement and protectively automatically shifted between successive stop or parking positions without danger of collision or jamming of the vehicles.

A further noteworthy object of the present invention is directed to an improved track installation or arrangement for a cable transport installation, especially an aerial cable or cableway transport installation, which track installation or arrangement can be erected with relatively modest structural costs in an efficiently designed building structure owing to the generally or essentially horizontal disposition of the track installation or arrangement.

A still further notable object of the present invention aims at providing an improved track installation or arrangement for stopping or parking vehicles of an aerial cable or cableway transport installation, which is relatively simple in construction and design, quite economical to manufacture, extremely reliable in operation, and requires a minimum of maintenance and servicing.

Now in order to implement these and still further objects of the invention, which will become more readily apparent as the description proceeds, the track installation or arrangement of the present development, among other things, is manifested by the features that the track or track line extends generally horizontally or in horizontal direction and the conveyor travels or extends along this generally horizontally extending track or track line over the full or complete length thereof. Stops or stop members are distributed over the length of the track or track line and define stop or parking positions or locations for the travelling vehicles. An actuation element or mechanism is provided for each of the stops or stop members. Also for each stop or parking position there is provided a vehicle sensor or feeler and an interrupter or interrupter mechanism. The vehicle sensor or feeler of each stop or parking position is connected with the actuation element of the stop or stop member and also with the interrupter or interrupter mechanism of the preceding or upstream stop or parking position viewed in a predetermined direction of travel or conveyance of the vehicles. Each interrupter or interrupter mechanism is constructed such that it can act upon an entrainment connection between an entrainment member of the conveyor and a vehicle.

The horizontal course or extent of the track or track line beneficially enables limiting the internal height of the building structure to the height actually needed for accommodating the vehicles. Additionally, with the track installation or arrangement as contemplated by the present invention, there are provided at the track or track line, not only exceedingly defined stop or parking positions or locations for the vehicles and at which such vehicles are automatically parked or stopped, but additionally the vehicles which remain upon the track or track line are automatically allocated to other stop or parking positions when one or more vehicles have been removed from the track or track line. In this way, there is achieved the beneficial result that the vehicles located upon the track or track line always tend to seek and occupy those stop or parking positions or locations which are situated closest to the outbound side of the track installation or arrangement. Since, as a general rule, the track or track line comprises both linear and curved track sections or portions it is possible by coordinating or matching the distance between the stops or stop members which define the stop or parking positions to park the vehicles at a minimum spacing from one another and to concomitantly maximumly utilize the length of the track or track line.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the exemplary embodiment of aerial cable transport installation, here shown as an aerial cableway and the related track installation or arrangement of the present development have been illustrated therein as needed to enable one skilled in the art to readily understand the underlying principles and concepts of this invention.

Further, it is remarked that in the showing of the drawings the therein depicted exemplary embodiment of aerial cable transport installation has been shown constituted by a gondola or cabin lift although it is to be understood that other types of revolving aerial cable transport installations are equally contemplated, such as chairlifts. Moreover, while the aerial cable transport installation of the present invention can be beneficially used for the transport of passengers, it is to be understood that it also can be employed in other fields of application, for instance for transporting goods or materials.

Figure 1:
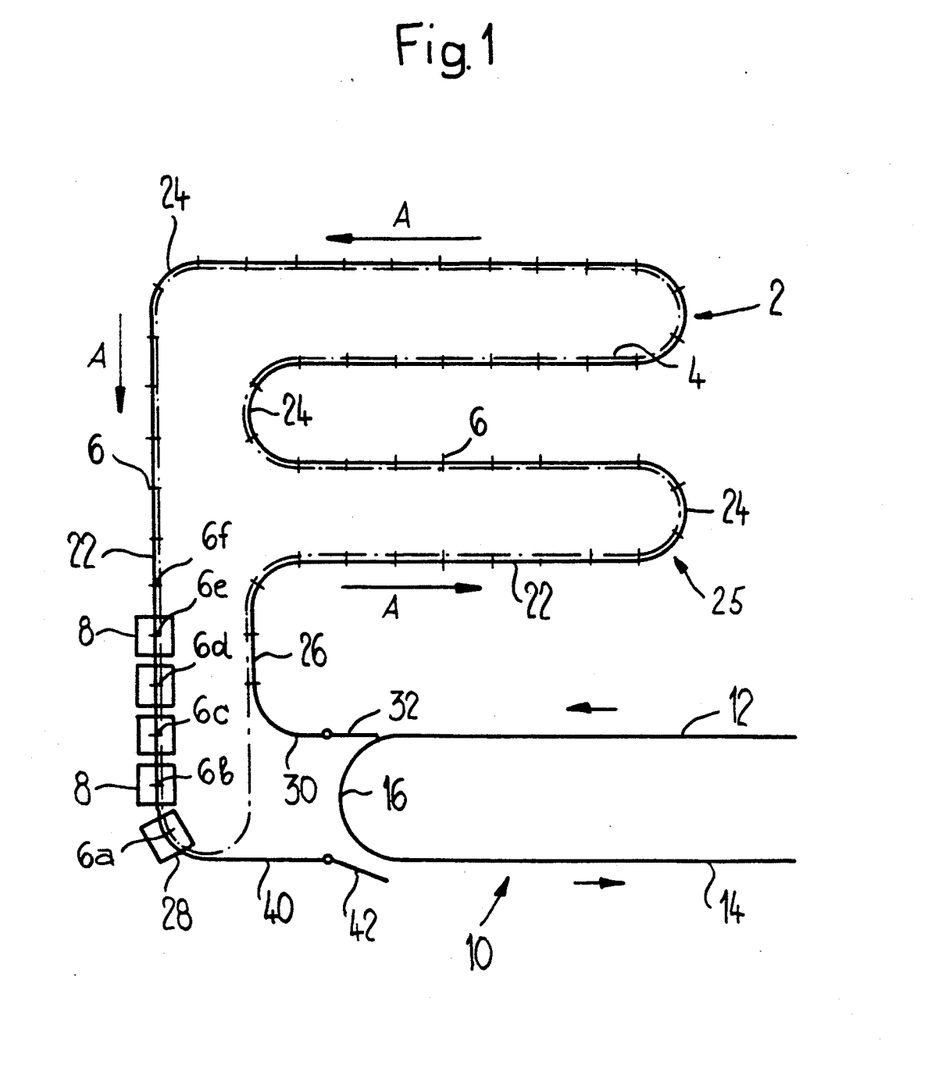
FIG. 1 illustrates in schematic plan view a track installation or arrangement designed according to the present invention in conjunction with a station which is here shown as a station of a revolving aerial cable or cableway transport installation designed as a gondola transport installation.

Turning now specifically to FIG. 1 of the drawings, there is depicted therein a track or track line 2 which comprises a number of essentially linear or straight track sections or portions 22 and track loops 25 formed by curved or arcuate track sections or portions 24. The track or track line 2 possesses a vehicle inbound side or region 26 and a vehicle outbound side or region 28. Both the vehicle inbound side 26 and the vehicle outbound side 28 terminate in neighboring relationship to a station track or main track or route, generally designated by reference character 10, of the aerial cableway, here shown as stated as a gondola aerial cableway. Moreover, there will be recognized that between a disembarking path or section 12 of the station track or main track 10 and the vehicle inbound side 26 of the track 2 there is provided a connection track 30 as well as a switch or switch mechanism 32. A further connection track 40 likewise equipped with a switch or switch mechanism 42 is arranged between the vehicle outbound side 28 of the track 2 and an embarking path or section 14. This embarking path or section 14 is connected by a curved or arcuate track section or portion 16 with the disembarking path or section 12.

As will be further seen by viewing FIG. 1, a conveyor or conveyor device 4, here only schematically shown in FIG. 1 but designed as a suitable chain conveyor, extends along the track or track line 2 throughout its entire or full length of extent and travels in a closed path to define a closed or endless conveyor 4. This endless conveyor or conveyor device 4 can be appropriately driven by any suitable drive means, for instance through the cable drive of the gondola aerial cableway and transports the travelling vehicles 8 along the parking track 2 in the direction of the arrows A. Further details of the chain conveyor or conveyor device 4 will be considered hereinafter.

Continuing, stop or parking positions or locations 6 are distributively arranged over the lengthwise extent of the generally horizontal track or track line 2 and the construction of which has been more closely revealed from the illustration of FIGS. 2 to 4 to be further considered hereinafter. In order to make maximum use of the length of the track or track line 2, the distance between the stop or parking positions 6 along the linear or straight track sections 22 is smaller than the distance between such stop or parking positions 6 along the curved or arcuate track sections 24 where the vehicles require a larger vehicle spacing due to the prevailing vehicle width. In FIG. 1, there have been depicted purely schematically the stop or parking positions 6 as well as a plurality of the vehicles 8. For ease of description, the depicted vehicles 8 have been shown parked at the stop or parking positions 6a, 6b, 6c, 6d and 6e of the track 2 as shown at the left-hand side of the illustration of FIG. 1.

Figure 3:
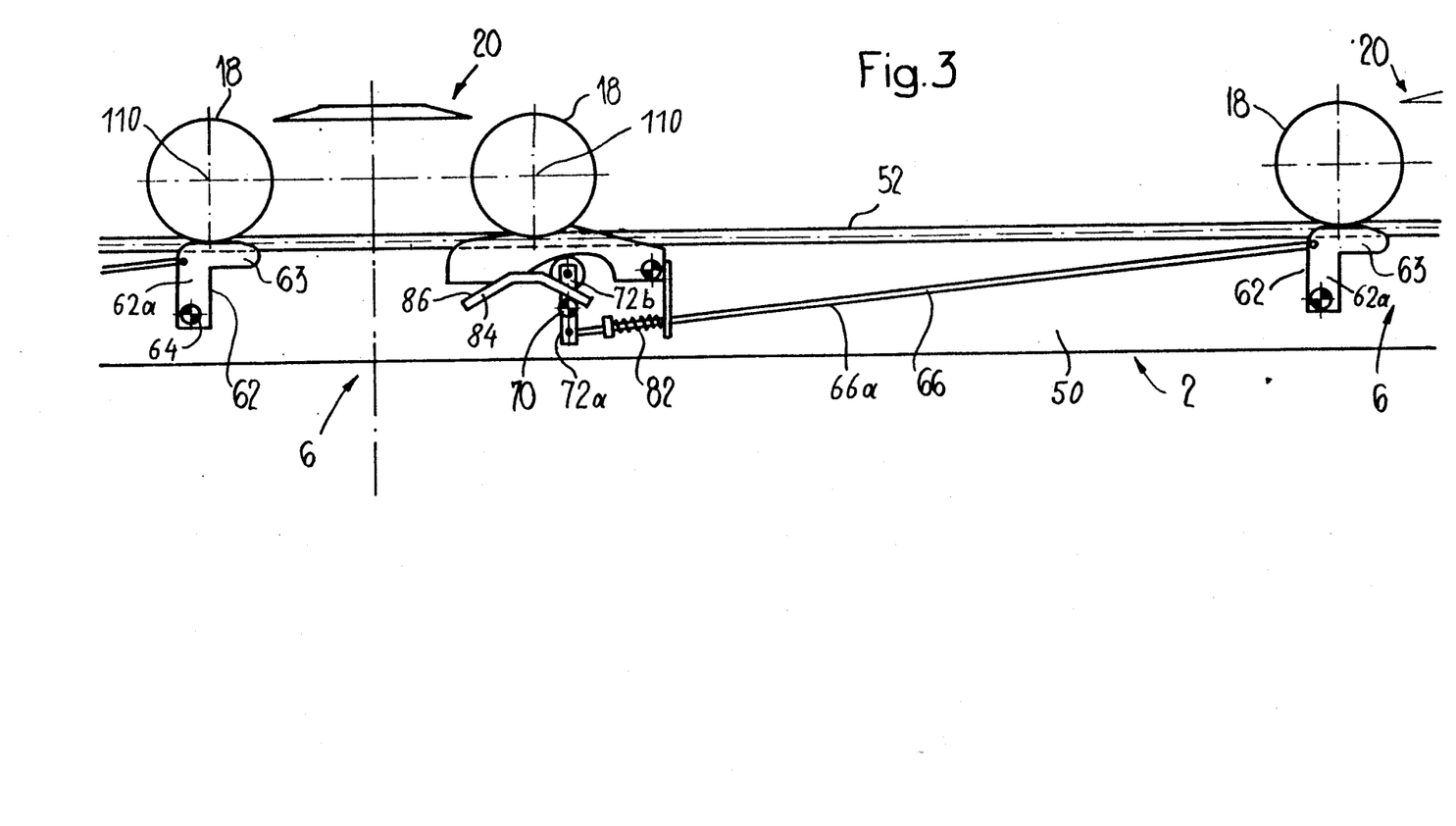
FIG. 3 is a fragmentary sectional view, like the illustration of FIG. 2, depicting a different operating state of the track or track line of the inventive track installation or arrangement.
Figure 4:
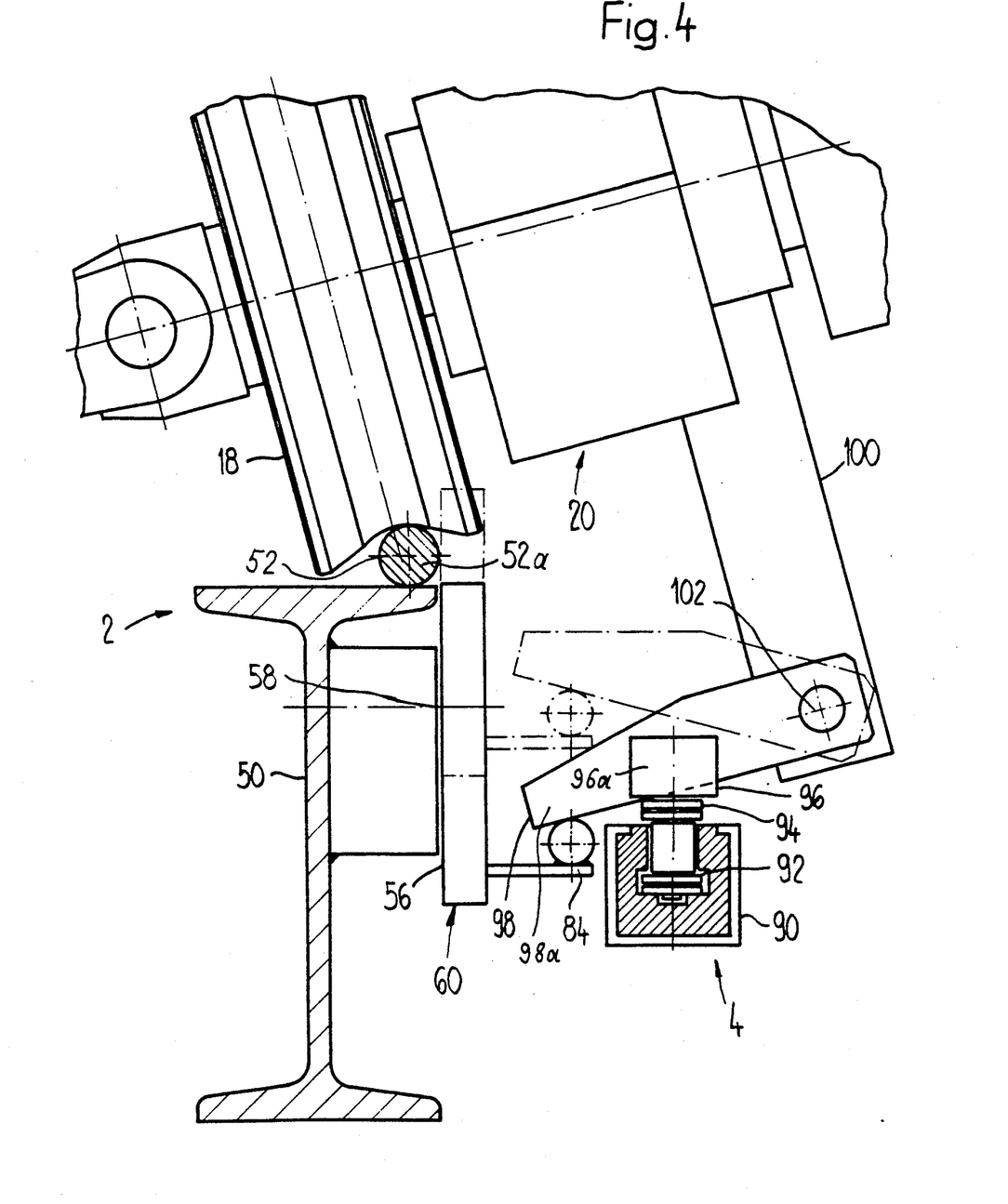
FIG. 4 is an enlarged cross-sectional view of the track or track line of the track installation or arrangement depicted in FIGS. 1 to 3.

Turning at this point to FIG. 4, it will be recognized that the track or track line 2 comprises a rail or rail member 52 formed by a circular or round rod 52a or equivalent structure and mounted upon a suitable support or carrier member 50, here shown as a double-T-shaped support or carrier member, also sometimes referred to in the art as an I-shaped support or carrier member. In any event, the rail or rail member 52 supports the carriages 20 or equivalent structure of the vehicles 8 by means of their travel or travelling wheels 18. At the double-T-shaped support or carrier member 50, there are provided stops or stop members 54 which are arranged in spaced relationship from one another at a spacing or distance which essentially corresponds to the spacing of the stop or parking positions or locations 6 from one another, as also will be seen by referring to FIGS. 2 and 3.

The stops or stop members 54 coact with the forwardmost or leading travelling wheel 18 of a carriage or carriage member 20 of an associated vehicle 8 moving the travel direction A. These stops or stop members 54 are designed as recesses or depressions 54a provided at an associated arm or arm member 56 of a double-arm lever or lever member 60—hereinafter generally referred to as a stop or impact lever or lever member 60—pivotably secured at the pivot or hinge location or means 58 at the support or carrier member 50. Moreover, a vehicle sensor or feeler 62 is operatively associated with each of the stop or parking positions 6 of the track 2. Each vehicle sensor or sensor member 62 is spaced from the stop or stop member 54 of the corresponding stop or parking position 6 approximately by the spacing or distance between the axles, generally indicated in FIG. 3 by reference character 110, of the travel or travelling wheels 18 of the associated vehicle carriage 20. Additionally, it will be recognized from the illustration of FIGS. 2 and 3 that at each stop or parking position 6, the vehicle sensor or feeler 62 is spaced rearwardly, in other words, opposite to the direction of travel or conveyance A of the vehicles 8 which is assumed to be from left to right in FIGS. 2 and 3, in relation to the associated stop or stop member 54.

Figure 2:
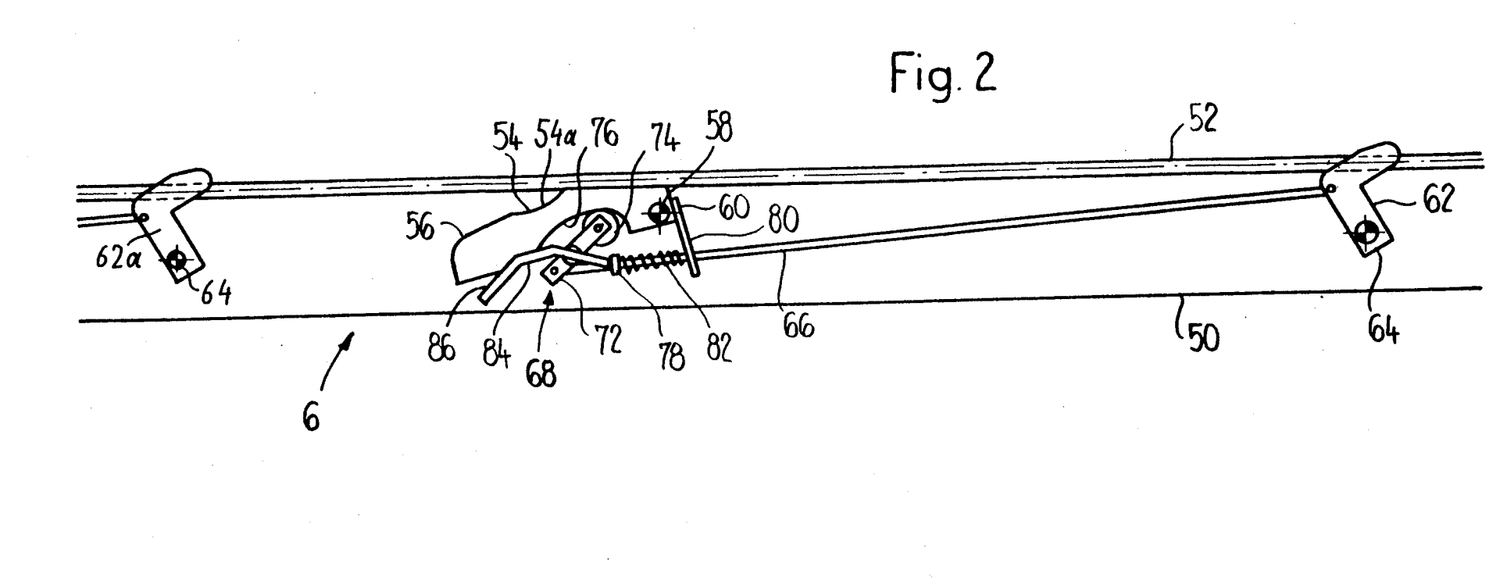
FIG. 2 illustrates in fragmentary elevational view on an enlarged scale a portion of the track or track line of the track installation depicted in FIG. 1.

By further referring to FIGS. 2 and 3 it will be recognized that each vehicle sensor or feeler 62 is constituted by a single-arm lever or lever member 62a possessing a bent or flexed end or terminal portion 63. Each such single-arm lever or lever member 62a is pivotably mounted at the pivot or hinge location or means 64 at the support or carrier member 50. A guide or control member 66, for instance constituted by a guide link 66a, interconnects the vehicle sensor or feeler 62 of any given stop or parking position 6 with an actuation element or mechanism, generally indicated by reference character 68, of the next following or upstream or trailing stop or parking position 6 viewed with respect to the direction of vehicle travel A. The actuation element or mechanism 68 here comprises a double-arm lever or lever member 72 which is pivotably mounted at the support or carrier member 50 at the pivot or hinge location or means 70. At the one lever arm 72a of this double-arm lever 72, there engages the guide or control member 66 and the other lever arm 72b of this double-arm lever 72 carries a roll or roller 74. This roll or roller 74 engages with a concave-formed guide or camming surface 76 provided at the arm or arm member 56 of the stop lever or lever member 60. The guide or control member 66 carries a compression or pressure spring 82 between an adjustment ring or ring member 78 and a second arm or arm member 80 of the stop lever 60. This compression or pressure spring 82 normally retains the stop or stop member 54 in an ineffectual or disabled position as depicted in FIG. 2. Furthermore, this compression or pressure spring 82 retains the vehicle sensor or feeler 62 in a position protruding into the predetermined path of travel A of the vehicles 8 and specifically into the path of travel of the travelling or travel wheels 18 as shown in FIG. 2 and by virtue of this upwardly tilted position of the vehicle sensor or feeler 62 there can be signalled or indicated that the corresponding stop or park position 6 is unoccupied by a vehicle 8.

If, as indicated in FIG. 3, a vehicle 8, schematically indicated by its vehicle carriage 20, is located at a stop or parking position 6, then the rear or trailing travelling wheel 18 retains the associated vehicle sensor or feeler 62 of such stop or parking position 6 in the depressed position depicted in FIG. 3 at the right-hand side thereof.

Equally, due to the action of the related guide or control member 66, the lever or lever member 72 together with the roll or roller 74, owing to the action of the biased compression or pressure spring 82 of the next preceding or upstream located stop or parking position 6, is retained in an essentially upright position or posture into which it has been rocked in counter-clockwise direction from the position depicted in FIG. 2 into the position depicted in FIG. 3. Owing to this pivotal movement of the lever or lever member 72 together with the roll or roller 74 the related stop lever or lever member 60 is pivoted or rocked in clockwise direction about the pivot means 58 and the corresponding stop or stop member 54 blocks by means of its recess or depression 54a the front travelling wheel 18 of the vehicle 8 located at this stop or parking position 6.

Reverting again to FIG. 4, it will be seen that there has been illustrated the chain conveyor or conveyor device 4 which, as already previously explained, co-extensively travels along the track or track line 2. This chain conveyor or conveyor device 4 comprises a link chain 92 arranged in a suitable chain guide or guide device 90. The link chain 92 of the chain conveyor 4 carries at its upper side or region 94 entrainment members 96a, here shown in the form of entrainment cams or cam members 96 which are spaced at a substantially uniform or regular distance from one another along the length of the link chain 92. During the travel mode of the vehicles 8, in other words, when the vehicles 8 travel along the track 2, entrainment members or elements 98a, here shown as entrainment pawls 98, of the vehicles 8 are in engagement with the entrainment cams 96.

Each of the entrainment pawls 98 are pivotably secured at an overhang or cantilever member 100 or the like of the carriage 20 of the related vehicle 8 for pivotal movement about a substantially horizontal axis or pivot shaft 102 or equivalent structure. The mutual spacing of the entrainment cams 96 of the chain conveyor 4 from one another can be basically freely selected, however it is advantageous to maintain such spacing or distance larger than the minimum permissible spacing between neighboring stop or parking positions or locations 6, in other words, the stop members 54 thereof present at the curved track sections 24 of the track installation.

From the illustrations of FIGS. 2, 3 and 4 it will be apparent that each stop or parking position or location 6 is provided with an interrupter or interrupter mechanism 84 which in each case is secured to the arm or arm member 56 of the associated stop or impact lever 60 and the purpose of which will be explained more fully hereinafter. In the ineffectual or disabled position of the stop or stop member 54 depicted in FIGS. 2 and 4, the interrupter or interrupter mechanism 84 is located in a lowered or depressed position, which in the showing of FIG. 4 has been illustrated with full or solid lines. Consequently, the entrainment pawl 98 of a vehicle 8 moves along the upper side 94 of the link chain 92 in contacting engagement over and past the interrupter or interrupter mechanism 84 and remains in undisturbed coacting relationship or engagement with the entrainment cam or cam member 96.

However, if the stop or stop member 54 is raised into its effectual or enabled position as depicted in FIG. 3, then the interrupter or interrupter mechanism 84 is placed into the raised position shown in chain-dot or phantom lines in FIG. 4. As a result, the entrainment pawl 98 of a vehicle 8 which is moved by the chain conveyor 4 travels onto a run-on or camming surface 86 provided at the interrupter or interrupter mechanism 84 and now is pivoted so that it comes out of engagement with the entrainment cams 96. Hence, at this vehicle 8 the link chain 92 no longer acts in a vehicle transporting or conveying manner and such vehicle 8 comes to rest at the corresponding stop or stop member 54. Therefore, due to the design of the stop or stop member 54 so as to possess the depression or pocket 54a the on-running leading travelling or travel wheel 18 is caught in such depression or pocket 54a and the stop or stop member 54 likewise prevents any retro or return movement of such stopped vehicle 8. Also in this case, there is ensured that the vehicle sensor or feeler 62 which is associated with such stop or parking position 6 assumes and retains the position depicted in FIG. 3 which signals the presence of a vehicle 8 at such stop of parking position 6.

If a vehicle 8, after release of the related stop or stop member 54, departs from the stop or parking position 6, then the vehicle sensor or feeler 62 thereof is released by the rear or trailing travelling wheel 18 of the departing or outbound vehicle 8, yet the compression or pressure spring 82 ensures that the vehicle sensor 62 is again pivoted back into the position depicted in FIG. 2 and the actuation element or mechanism 68 of the preceding or upstream located stop or parking position 6 allows the associated stop or stop member 54 to return back into the ineffectual or disabled position. The compression or pressure spring 82 thus acts as a return or restoring element for the vehicle feeler 62 and the stop or stop member 54.

It will be appreciated that in contrast to the position depicted in FIG. 2, the vehicle sensor or feeler 62 is pivoted or rocked in clockwise direction by the arriving travelling wheel 18 of the corresponding vehicle 8, and the bent or flexed end portion 63 of such lowered or depressed vehicle sensor 62 can bear against such travelling wheel 18.

With respect to the explanation of the mode of operation of the track installation or arrangement of the present development it is assumed that a vehicle 8 is to be parked and removed from the revolving path of travel or main track or route 10 of the aerial cable transport installation. Hence, this vehicle 8 is, for instance, manually transferred or brought from the disembarking path or section 12 through the switch 32 and the subsequent connection track 30 to the inbound side 26 of the track or track line 2. As a result, this vehicle 8 reaches the operative region of the chain conveyor 4 and is entrained by one of the entrainment cams 96 of the link chain 92 coacting with the entrainment pawl or pawl member 98 of such vehicle 8 and then conveyed, without being hindered by the stops or stop members 54 of the unoccupied stop or parking positions or locations 6, along the track or track line 2 in the direction of travel A. Since according to the showing of FIG. 1 the stop or parking position or location 6e is occupied and the vehicle sensor 62 has raised, by means of the associated guide mechanism 66, the stop or stop member 54 of the next preceding or upstream located stop or parking position 6f into the position depicted in FIG. 3, the vehicle 8 which arrives at the stop or parking position 6f will be brought to standstill or rest in the manner previously described.

The described operation repeats automatically at further unoccupied stop or parking positions 6 whenever further vehicles 8 are shunted out of the main revolving path of travel or main track or route 10 of the aerial cable transport installation into the stop or parking track or track line 2 of the inventive track installation and thus arrive at the operative region or zone of the chain conveyor 4.

If vehicles 8, which have been previously parked at the track or track line 2, now should be transferred into the revolving path of travel or main track or route 10 of the aerial cable transport installation, then through the use of any suitable and thus not particularly illustrated means, for instance manually-operated means, the stop or stop member 54 which is associated with the stop or parking position 6a is rendered ineffectual or disabled. Such, for instance, manually-operated means could be provided in lieu of the vehicle sensor or feeler 62 which is not absolutely required at this stop or parking position 6a. Thereafter, if the vehicle 8 which is located at such stop or parking position 6a is moved onto the connection track 40, then the vehicle sensor 62 thereof assumes the position depicted in FIG. 2 signalling the absence of a vehicle 8. The stop or stop member 54 of the directly upstream located or trailing stop or parking position 6b is thus rendered ineffectual or disabled and releases the leading travelling wheel 18 of the related vehicle 8. At the same time, and by virtue of the pivoting of the interrupter or interrupter mechanism 84 together with the stop or impact lever 60 in the counter-clockwise direction, the entrainment pawl 98 now can come into contact with the upper side 94 of the link chain 92 and can be engaged or acted upon by an entrainment cam 96 of the link chain 92 for enabling vehicle conveyance or forward advance. During such time as the corresponding vehicle 8 is thus transported to the next forward located stop or parking position or location 6a and at that location brought to standstill or rest in the described manner, the vehicle sensor or feeler 62 of the stop or parking position 6b can be pivoted into the position depicted in FIG. 2 and thus signals or reports the unoccupied condition of such stop or parking position 6b to the next upstream or trailing situated stop or parking position 6c. At this stop or parking position 6c the stop lever 60 correspondingly pivots or rocks and a vehicle 8 located at such stop or parking position 6c is released and can move up by the amount of one stop or parking position closer to the outbound side 28 of the track 2. It will be apparent that the described operation repeats in corresponding time sequence or sequentially at all further upstream located stop or parking positions which are occupied by vehicles 8.

Instead of accomplishing transfer of the vehicles 8 manually from the disembarking path or section 12 to the inbound side 26 or from the outbound side 28 to the embarking path or section 14, as the case may be, this task could also be fulfilled by conveyor means which are motor driven. These conveyor means, for instance pneumatic wheels or tires as are frequently used in this technology, can be driven at the same velocity as the velocity of the pneumatic wheels or tires which move the vehicles along the disembarking path 12 and the embarking path 14. Also the switches or switch members 32 and 42 can be provided with a motor drive and automatically actuated.

Additionally, it is possible to not only automate the transfer of the vehicles 8 from the track or track line 2 to the revolving path of travel or main track or route 10 of the aerial cable transport installation, but such can also be accomplished in a prescribed timewise sequence or clock rate or time. For instance, this timewise sequence can be accommodated to the original cycling or clock time or clock rate of the vehicles which are in revolving travelling motion at the main track or route 10 of the aerial cable transport installation. Thus, the transfer of successive vehicles can be accomplished in a timewise spacing which equals the original clock rate or time of the vehicles at the main revolving path of travel or main track or route 10. In so doing, the infeed of further vehicles into such main revolving path of travel can be, for instance, coordinated to the circulating or revolving vehicles such that the original clock time or rate of the vehicles is exactly halved. In order to make certain that the entry of the further vehicles is accomplished at an exactly predeterminate point in time, it is possible when using a conveyor or conveyor device possessing entrainment members to predetermine a starting position of such entrainment members and to then orient such starting position. The orientation or positioning of the predetermined starting position of the entrainment members can be accomplished either whenever the conveyor device is stopped or prior to the initial release of a vehicle from the last stop or parking position of the track or track line 2 of the track installation. If the drive of the conveyor device is derived from the drive of the aerial cable transport installation, then the coupling or clutch structure which is needed anyway for stopping the conveyor device can be employed for orienting the predetermined starting position of the entrainment members. It is here also remarked that the conveyor device advantageously always then is brought to standstill when the number of vehicles which are in circulation or revolving movement in any event is momentarily retained at a constant value.

Advantageously, a track installation or arrangement constructed according to the present invention can be provided at both stations of the aerial cableway of a revolving path of travel or main track or route thereof or at the end or terminal stations of an aerial cable transport installation which possesses a number of conveying sections. The inventive track installation can, however, also be installed as a dam-up or buffer section between revolving travel paths or main tracks which form sections of a common installation. It is regarded as even conceivable to design the inbound side and the outbound side such that they can be selectively connected or brought into operative association with both revolving travel paths or main tracks so that it is possible to remove vehicles from both revolving travel paths or main tracks and also to deliver vehicles into both revolving travel paths or main tracks.

While there are shown and described present preferred embodiments of the invention, it is to be distinctly understood that the invention is not limited thereto, but may be otherwise variously embodied and practiced within the scope of the following claims.

Accordingly, what we claim is:

1. A track installation for vehicles of a transport installation, especially a revolving aerial cable transport installation, each of the vehicles having a vehicle carriage, comprising:

track means possessing a vehicle inbound side and a vehicle outbound side;

said track means serving for supporting the vehicles at said vehicle carriages for movement in a predetermined direction of travel;

conveyor means provided for said track means for transporting the vehicles in said predetermined direction of travel;

said conveyor means including entrainment means for entrainingly engaging said vehicles for the transport of said vehicles in said predetermined direction of travel;

said track means comprising a generally horizontally extending track which extends along essentially the entire length of said track means;

a plurality of operatively interconnected stop means distributively arranged along said generally horizontally extending track;

each of said stop means defining a parking position for the vehicles;

actuation means provided for each of said stop means for the selective placement of each of said stop means into a position for parking a vehicle at an associated parking position;

a vehicle sensor provided for each parking position;

interrupter means provided for each parking position;

means for operatively connecting each vehicle sensor with the actuation means and the interrupter means of a parking position located upstream with respect to the parking position of said respective vehicle sensor;

said interrupter means acting upon the entrainment engagement between an entrainment member of the conveyor means and a vehicle;

the vehicle carriage of each vehicle supporting travel wheels of the associated vehicle; and spring means acting upon each vehicle sensor for retaining the vehicle sensor in a position protruding into a path of travel of the travel wheels of the vehicles.

2. The track installation as defined in claim 1, wherein:

each vehicle sensor comprises a pivotable lever;

means for pivotably securing each said pivotable lever at said track means;

said connecting means comprising link means provided for each parking position;

said link means of each given parking position being connected with the actuation means of a parking position located upstream thereof with respect to the predetermined direction of travel of the vehicles; and restoring means coacting with the vehicle sensor and the stop means of each parking position.

3. The track installation as defined in claim 2, wherein:

each stop means is structured to retain a vehicle within an operative region of the vehicle sensor of the associated parking position.

4. The track installation as defined in claim 2, wherein:

said actuation means comprises a lever operatively connected with said link means;

each stop means comprising a pivotable lever member pivotably mounted at said track means and possessing a guide surface;

a roll provided for each lever operatively connected with said link means; and each said lever operatively connected with said link means engaging by means of the roll at said guide surface of the pivotable lever member of the associated stop means.

5. The track installation as defined in claim 1, wherein:

each stop means is structured to retain a vehicle within an operative region of the vehicle sensor of the associated parking position.

6. The track installation as defined in claim 1, wherein:

said track installation defines a buffer path between neighboring sections of a revolving aerial cable transport installation containing a plurality of said sections.

7. A track installation for vehicles of a transport installation, especially a revolving aerial cable transport installation, each of the vehicles having a vehicle carriage, comprising:

track means possessing a vehicle inbound side and a vehicle outbound side;

said track means serving for supporting the vehicles at said vehicle carriages for movement in a predetermined direction of travel;

conveyor means provided for said track means for transporting the vehicles in said predetermined direction of travel;

said conveyor means including entrainment means for entrainingly engaging said vehicles for the transport of said vehicles in said predetermined direction of travel;

said track means comprising a generally horizontally extending track which extends along essentially the entire length of said track means;

stop means distributively arranged along said generally horizontally extending track;

each of said stop means defining a parking position for the vehicles;

each stop means is structured to retain a vehicle within an operative region of the vehicle sensor of the associated parking position;

each of said stop means comprising a pivotable lever member;

means for pivotably mounting each of said lever members at said track means;

each said pivotable lever member being provided with recess means;

actuation means provided for each of said stop means for the selective placement of each of said stop means into a position for parking a vehicle at an associated parking position;

a vehicle sensor provided for each parking position;

interrupter means provided for each parking position;

means for connecting the vehicle sensor of each parking position with the actuation means and the interrupter means of a parking position located upstream with respect to the predetermined direction of travel of the vehicles; and said interrupter means acting upon the entrainment engagement between an entrainment member of the conveyor means and a vehicle.

8. The track installation as defined in claim 7, wherein:

each of said vehicles comprise entrainment pawl means for engagement with said entrainment means of said conveyor means; and said interrupter means, when assuming an effectual position thereof, retaining the entrainment pawl means of a vehicle parked at the associated parking position out of engagement with said entrainment means of said conveyor means.

9. The track installation as defined in claim 8, wherein:

each said interrupter means being rigidly connected with said stop means of the associated parking position.

10. A track installation for vehicles of a transport installation, especially a revolving aerial cable transport installation, each of the vehicles having a vehicle carriage, comprising:

track means possessing a vehicle inbound side and a vehicle outbound side;

said track means serving for supporting the vehicles at said vehicle carriages for movement in a predetermined direction of travel;

conveyor means provided for said track means for transporting the vehicles in said predetermined direction of travel;

said conveyor means including entrainment means for entrainingly engaging said vehicles for the transport of said vehicles in said predetermined direction of travel;

said track means comprising a generally horizontally extending track which extends along essentially the entire length of said track means;

stop means distributively arranged along said generally horizontally extending track;

each of said stop means defining a parking position for the vehicles;

actuation means provided for each of said stop means for the selective placement of each of said stop means into a position for parking a vehicle at an associated parking position;

a vehicle sensor provided for each parking position;

interrupter means provided for each parking position;

means for connecting the vehicle sensor of each parking position with the actuation means and the interrupter means of a parking position located upstream with respect to the predetermined direction of travel of the vehicles;

said interrupter means acting upon the entrainment engagement between an entrainment member of the conveyor means and a vehicle;

each vehicle sensor comprising a pivotable lever;

means for pivotably securing each said pivotable lever at said track means;

said connecting means comprising link means provided for each parking position;

said link means of each given parking position being connected with the actuation means of a parking position located upstream therefrom with respect to the predetermined direction of travel of the vehicles;

restoring means coacting with the vehicle sensor and the stop means of each parking position;

said actuation means comprising a lever operatively connected with said link means;

each stop means comprising a pivotable lever member pivotably mounted at said track means and possessing a guide surface;

a roll provided for each lever operatively connected with said link means; and each said lever operatively connected with said link means engaging by means of the roll at said guide surface of the pivotable lever member of the associated stop means.

11. A track installation for vehicles of a transport installation, each of the vehicles being provided with a vehicle carriage, comprising:

track means possessing a vehicle inbound side and a vehicle outbound side;

said track means serving for supporting the vehicles at said vehicle carriages for movement in a predetermined direction of travel;

conveyor means provided for said track means for transporting the vehicles in said predetermined direction of travel;

said conveyor means being provided with entrainment means for entrainingly coacting with said vehicles for the transport of said vehicles in said predetermined direction of travel;

said track means comprising an essentially horizontally extending track which extends along essentially the entire length of said track means;

stop means distributively arranged along said essentially horizontally extending track;

each of said stop means defining a parking position for the vehicles;

actuation means provided for each of said stop means for placement of each of said stop means into a position for parking a vehicle at an associated parking position;

a vehicle sensor provided for each parking position;

interrupter means provided for each parking position for interrupting the entraining coaction between said conveyor means and a vehicle parked at the associated parking position;

means for operatively connecting the vehicle sensor of each parking position with the actuation means and with the interrupter means of a parking position located upstream with respect to the predetermined direction of travel of the vehicles the vehicle carriage of each vehicle supporting travel wheels of the associated vehicle; and spring means acting upon each vehicle sensor for retaining the vehicle sensor in a position protruding into a path of travel of the travel wheels of the vehicles.

* * * * *